Dec. 18, 1923.
G. B. SMITH ET AL
1,477,670
CLUTCH FOR PIPE LAYING MACHINES
Filed Oct. 29, 1921   3 Sheets-Sheet 1
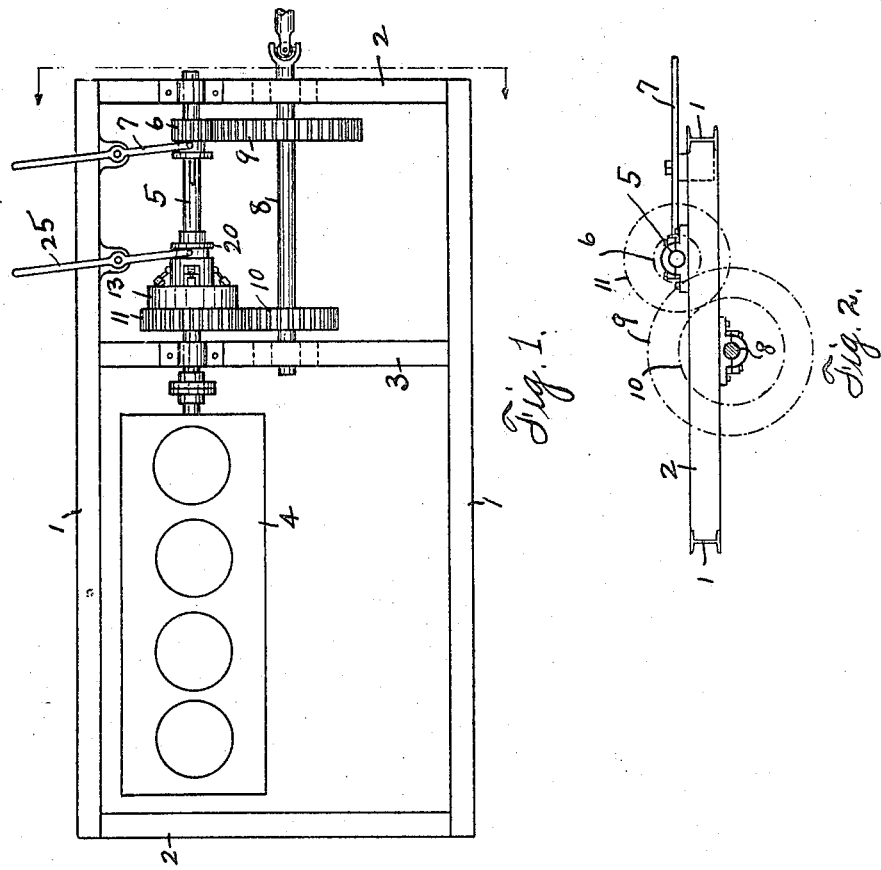
Inventors
George B. Smith
Roy W. Sanders
By
Hardway Cather
Attorneys Dec. 18, 1923.
G. B. SMITH ET AL
1,477,670
CLUTCH FOR PIPE LAYING MACHINES
Filed Oct. 29, 1921 3 Sheets-Sheet 2
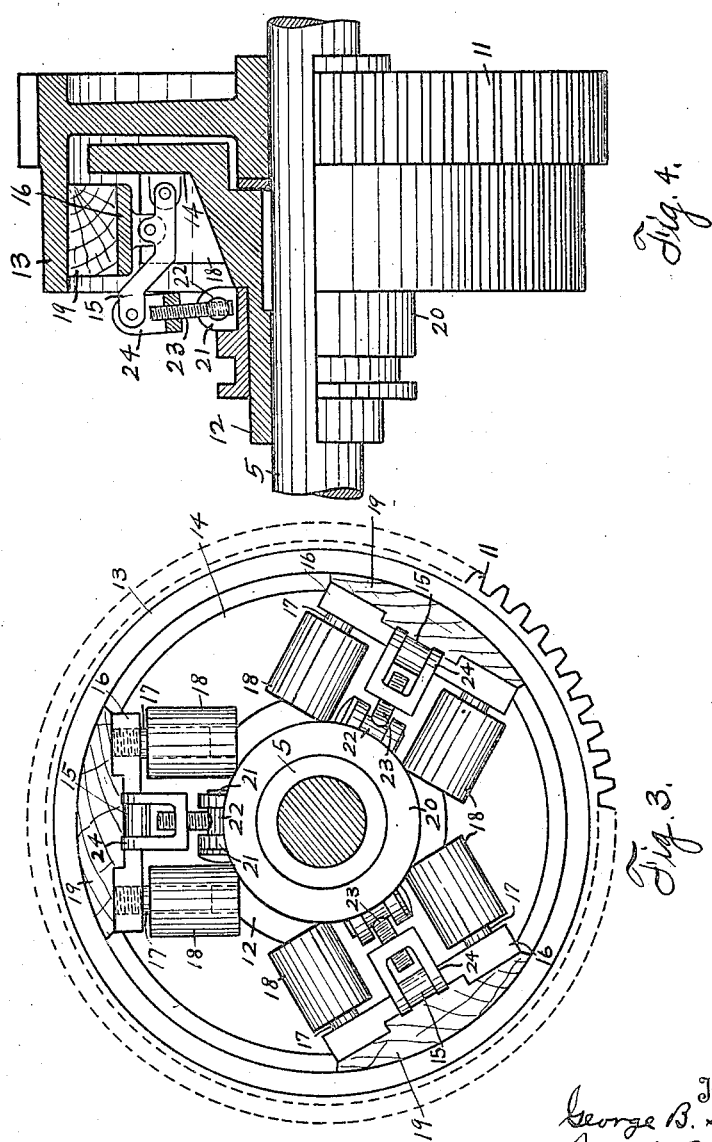

Dec. 18, 1923.  
G. B. SMITH ET AL  
1,477,670  
CLUTCH FOR PIPE LAYING MACHINES  
Filed Oct. 29, 1921   3 Sheets-Sheet 3
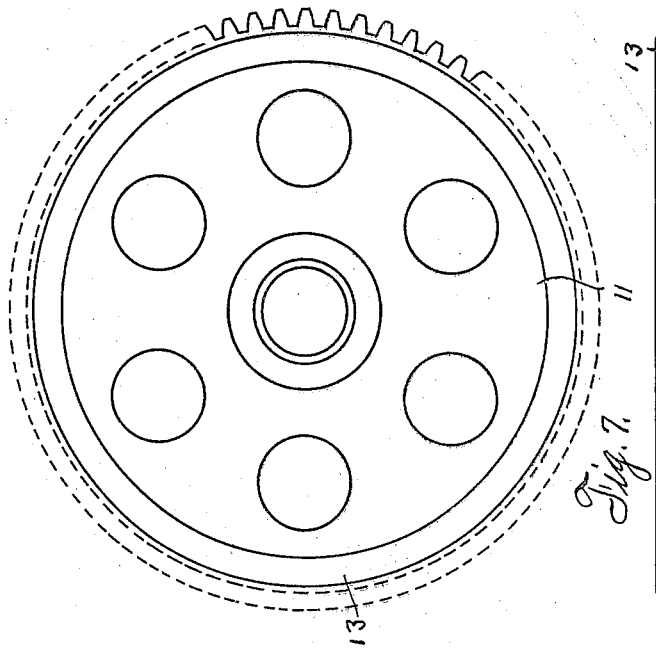
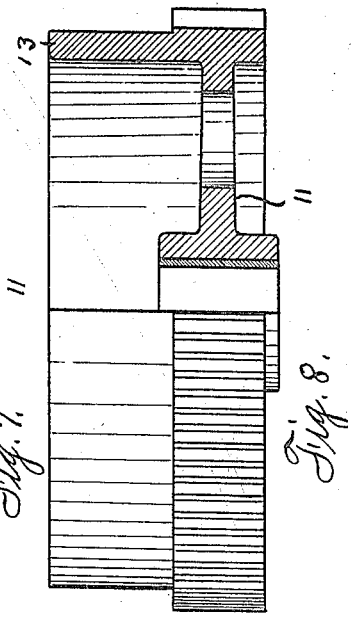
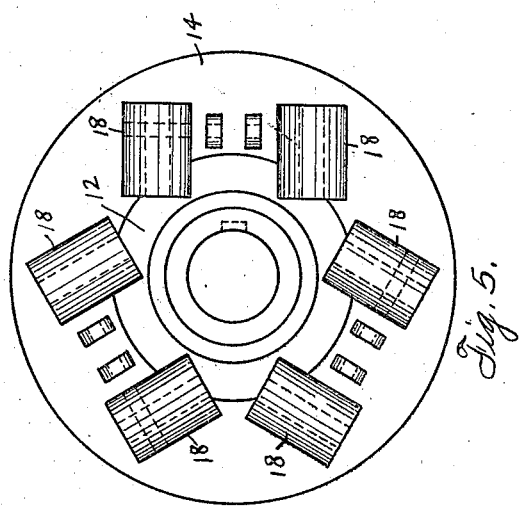
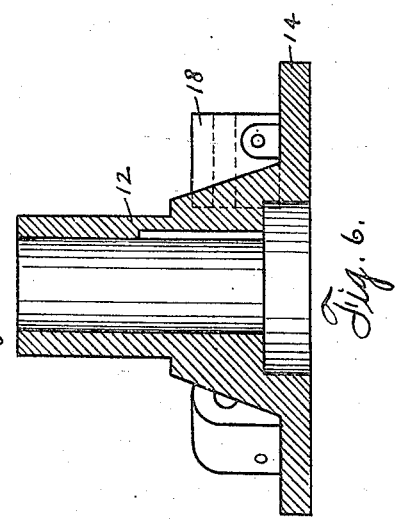
Inventors  
George B. Smith  
Roy W. Sanders  
By  
Hardway & Cathey  
Attorneys Patented Dec. 18, 1923.

1,477,670

UNITED STATES PATENT OFFICE.

GEORGE B. SMITH AND ROY W. SANDERS, OF HOUSTON, TEXAS.

CLUTCH FOR PIPE-LAYING MACHINES.

Application filed October 29, 1921. Serial No. 511,453.

*To all whom it may concern:*

Be it known that we, GEORGE B. SMITH and ROY W. SANDERS, citizens of the United States, residing at Houston, in the county of Harris and State of Texas, have invented certain new and useful Improvements in a Clutch for Pipe-Laying Machines, of which the following is a specification.

This invention relates to new and useful improvements in a clutch for pipe laying machines.

One object of the invention is to provide a clutch specially adapted for a pipe laying machine designed for use in laying pipe lines and embodying means for screwing additional joints of pipe onto the line as the work progresses.

Another object resides in the provision of a machine of this character whereby the motor may be connected to a joint of pipe to be screwed into the line through a clutch which will slip when a given load is exceeded, so that should the threads become crossed, in screwing the joint onto the line, the clutch will slip and the threads will not become battered and ruined.

With the above and other objects in view this invention has particular relation to certain novel features of construction, operation and arrangement of parts an example of which is given in this specification and illustrated in the accompanying drawings, wherein:—

Figure 1 shows a plan view of the driving mechanism of a pipe laying machine.

Figure 2 shows an end view thereof.

Figure 3 shows an end view of the clutch employed.

Figure 4 shows a side view partially in section.

Figure 5 shows an end view of the driving member thereof.

Figure 6 shows a longitudinal sectional view of the driving member.

Figure 7 shows an end view of the driven member, and

Figure 8 shows a side view thereof, partially in section.

Referring more particularly to the drawings the numerals 1, 1 designate the side members of the framework, which also has the end members 2, 2 and the cross bar 3. A motor 4 is located on the framework and connected to it is the drive shaft 5. This shaft has a small spur gear wheel 6 splined thereon and connected to it there is the shift lever 7 which is pivoted to one of the side members 1. The numeral 8 designates a driven shaft, rotatably mounted on the framework, and fixed upon it are the spur gear wheels 9 and 10. The driven shaft is arranged to be connected to the joint of pipe to be rotated, by any suitable mechanism designed for the purpose.

The gear 6 may be shifted into mesh with the gear 9 and the shaft 8 thereby positively driven from the motor, or may be shifted out of mesh therewith and said shaft 8 connected with the motor through the clutch hereinafter described.

This clutch embodies the driven member 11, loosely mounted on the motor shaft 5 and formed with a spur gear to mesh with the gear to be driven, and also includes a driving member 12 fixed on said shaft 5. The driven member has an annular hood 13 formed integrally therewith and the driving member 12 has an annular flange 14 within said hood. Pivoted to this flange are a plurality of levers 15 which carry the yokes 16. Threaded into the respective ends of these yokes are the guide rods 17, 17 which work in the opposing bearings 18, 18, formed integrally with the driving member. These yokes have the wooden friction blocks 19 secured thereon, and whose outer sides are convex to conform to the contour of the hood 13 with which they are adapted to frictionally engage. Slidably mounted on the driving member there is a sleeve 20 having the spaced bearings 21, 21 carried thereby in which the respective shafts 22 rotate and the outwardly threaded rods 23 have one end threaded through said shafts between said bearings and their other ends threaded into the brackets 24 which are pivotally connected to the outer ends of the respective levers 15.

The sleeve may be actuated through the manual lever 25 connected thereto and pivoted to the adjacent side member 1. When said sleeve is moved outwardly the friction blocks 19 will be moved inwardly out of contact with the hood 13 and the driven member will be declutched from the driving member and vice versa.

When an additional joint is to be added to the line the driven shaft 8 is clutched with the drive shaft 5 through the clutch above described, and the spur gear 6 is shifted out of mesh with the gear 9. When the joint of pipe is threaded onto the line the clutch will then slip and is disengaged and the gear 6 is again shifted into mesh with the gear 9 to screw the joint up tight onto the line. If the threads should become crossed in screwing the joint onto the line the extra load will cause the clutch to slip before the threads are battered and ruined. The adjusting rods 23 are provided so that the clutch can be set to carry only a predetermined load and to thereafter slip so as to prevent the threads from being ruined should they become crossed.

What we claim is:—

A clutch including a driven member loosely mounted on a driving shaft, a driving member fixed on said shaft, an annular hood formed integrally with the driven member, an annular flange carried by the driving member within said hood, a plurality of levers pivoted to said flange, yokes pivoted to the respective levers, guide rods carried by the respective ends of said yokes, bearings formed integrally with the driving member, in which said respective rods work, friction blocks secured to the respective yokes, the outer sides of said friction blocks being convex to conform to the contour of the said annular hood, with which they are adapted to frictionally engage, a sleeve slidably mounted on the driving member, spaced bearings carried by said sleeve, shafts rotatable in said spaced bearings, outwardly threaded rods threaded through said respective shafts between the said bearings, brackets pivotally connected to the outer ends of the respective levers through which said outwardly threaded rods are threaded and means for actuating said sleeve whereby said friction blocks may be manipulated into engagement with and released from said hood.

In testimony whereby we have signed our names to this specification in the presence of two subscribing witnesses.

GEORGE B. SMITH.
R. W. SANDERS.

Witnesses:
S. G. LOY,
A. C. FRIDGE.